United States Patent [19]
Krull

[11] Patent Number: 5,658,116
[45] Date of Patent: Aug. 19, 1997

[54] BULK FEED DELIVERY SYSTEM

[75] Inventor: Gregory J. Krull, George, Iowa

[73] Assignee: Sudenga Industries, Inc., George, Iowa

[21] Appl. No.: 566,136

[22] Filed: Dec. 1, 1995

[51] Int. Cl.$^6$ .................................................. B65G 65/46
[52] U.S. Cl. ................. 414/326; 105/282.3; 222/502; 222/547; 414/520
[58] Field of Search ........................ 414/326, 327, 414/519, 520, 526; 222/502, 547, 413; 298/27, 28; 105/247, 251, 254, 255, 257, 250, 282.1, 282.3, 288–292, 305, 294

[56] References Cited

U.S. PATENT DOCUMENTS

| | | | |
|---|---|---|---|
| 609,816 | 8/1898 | Kramer | 105/282.1 X |
| 987,877 | 3/1911 | Harrigan | 105/282.3 X |
| 2,412,121 | 12/1946 | Bradshaw | 222/413 X |
| 2,601,608 | 6/1952 | Hansen | 414/526 X |
| 3,227,100 | 1/1966 | Smith et al. | 105/305 X |
| 3,240,366 | 3/1966 | Sahr | 414/520 X |
| 3,356,270 | 12/1967 | Heider | 414/520 X |
| 3,490,623 | 1/1970 | Steckelberg | 414/520 |
| 3,632,174 | 1/1972 | Miller | 414/520 X |
| 5,085,025 | 2/1992 | Gaddis | 414/526 X |
| 5,505,583 | 4/1996 | Gaddis et al. | 414/526 |

FOREIGN PATENT DOCUMENTS

| | | | |
|---|---|---|---|
| 815162 | 11/1951 | Germany | 414/520 |
| 709485 | 1/1980 | U.S.S.R. | 222/502 |

OTHER PUBLICATIONS

"Delivery System Gate Design of Courtesy Enterprises, Incorporated" drawing, 1 page.
Warren Manufacturing, Inc., "Rack and Pinion Gates" drawing, (Apr. 1988), 1 p.

*Primary Examiner*—David A. Bucci
*Attorney, Agent, or Firm*—Kinney & Lange, P.A.

[57] ABSTRACT

A bulk feed delivery system includes a bulk body having a dispensing opening extending along a bottom end thereof; a pair of gates arranged adjacent the dispensing opening, the gates being movable between a first position to close the dispensing opening and a second position to open the dispensing opening; a gate cover; a plurality of gate supports fictionally supporting the gates under the gate cover, each gate support having a surface; and a gate guide mechanism mounted to an underside of each of the pair of gates, each of the gate guide mechanisms being operable with the respective surface of the gate supports for controlling the movement and orientation of the gates during movement between the first and second positions.

21 Claims, 4 Drawing Sheets

BULK FEED DELIVERY SYSTEM

BACKGROUND OF THE INVENTION

The present invention relates to a bulk feed delivery system which is used to transport and dispense feed or other particular material for farm animals or the like. More particularly, the present invention relates to a gate mechanism within a bulk feed body compartment of the delivery system.

Bulk feed delivery systems and gate mechanisms therefore are well known in the art. These systems are used to haul livestock feed from a mill to the farms. A plurality of bulk feed body compartments are typically arranged together to haul a variety of different feeds at the same time.

It is known to provide a bulk feed delivery system, such as is available from Warren Manufacturing, Inc. of Birmingham, Ala., which includes a bulk feed body compartment having a dispensing opening, an auger pan surrounding the dispensing opening, an auger within the auger pan for transporting the particulate material, and a gate mechanism for controlling the flow of the particulate material through the dispensing opening. The gate mechanism includes a gate cover mounted to the bulk feed body compartment in a inverted "V" shape and oriented at a 120° angle, a pair of gates arranged under the gate cover, a plurality of gate supports, and a rack and pinion gear system for moving the gate to a first position for opening the dispensing opening and second position for closing the dispensing opening. The gates supports have an open V-shaped frame construction.

However, one of the problems associated with such gates mechanisms is that gate movement is actuated from the center of the gates. In such an arrangement, the ends of the gates simply rest on the gate supports and ride against the walls of the compartment. Accordingly, it is difficult to control the lateral movement of the gates as they are raised and lowered. In other words, as the gates are raised or lowered from their center position the ends of the gate tend to either rise or fall unevenly with the center, thereby creating an uneven flow of feed through the dispensing opening. The uneven movement of the gates may also cause the gates to jam against the compartment body.

SUMMARY OF THE INVENTION

According to the present invention, a bulk feed delivery system includes a bulk body having a dispensing opening extending along a bottom end thereof; a pair of gates arranged adjacent the dispensing opening, the gates being movable between a first position to close the dispensing opening and a second position to open the dispensing opening; a gate cover; a plurality of gate supports frictionally supporting the gates under the gate cover, each gate support having a surface; and a gate guide mechanism mounted to an underside of each of the pair of gates, each of the gate guide mechanisms being operable with the respective surface of the gate supports for controlling the movement and orientation of the gates during movement between the first and second positions.

In one embodiment, the gate guide mechanism in provided in the form of a plurality of wheels mounted on a base plate. The width of the base plate is less than the diameter of the wheels to assure that the gate and the gate guide mechanism have a tight fit with the gate supports.

DETAILED DESCRIPTION OF THE PREFERRED EMBODIMENTS

Figure 1:
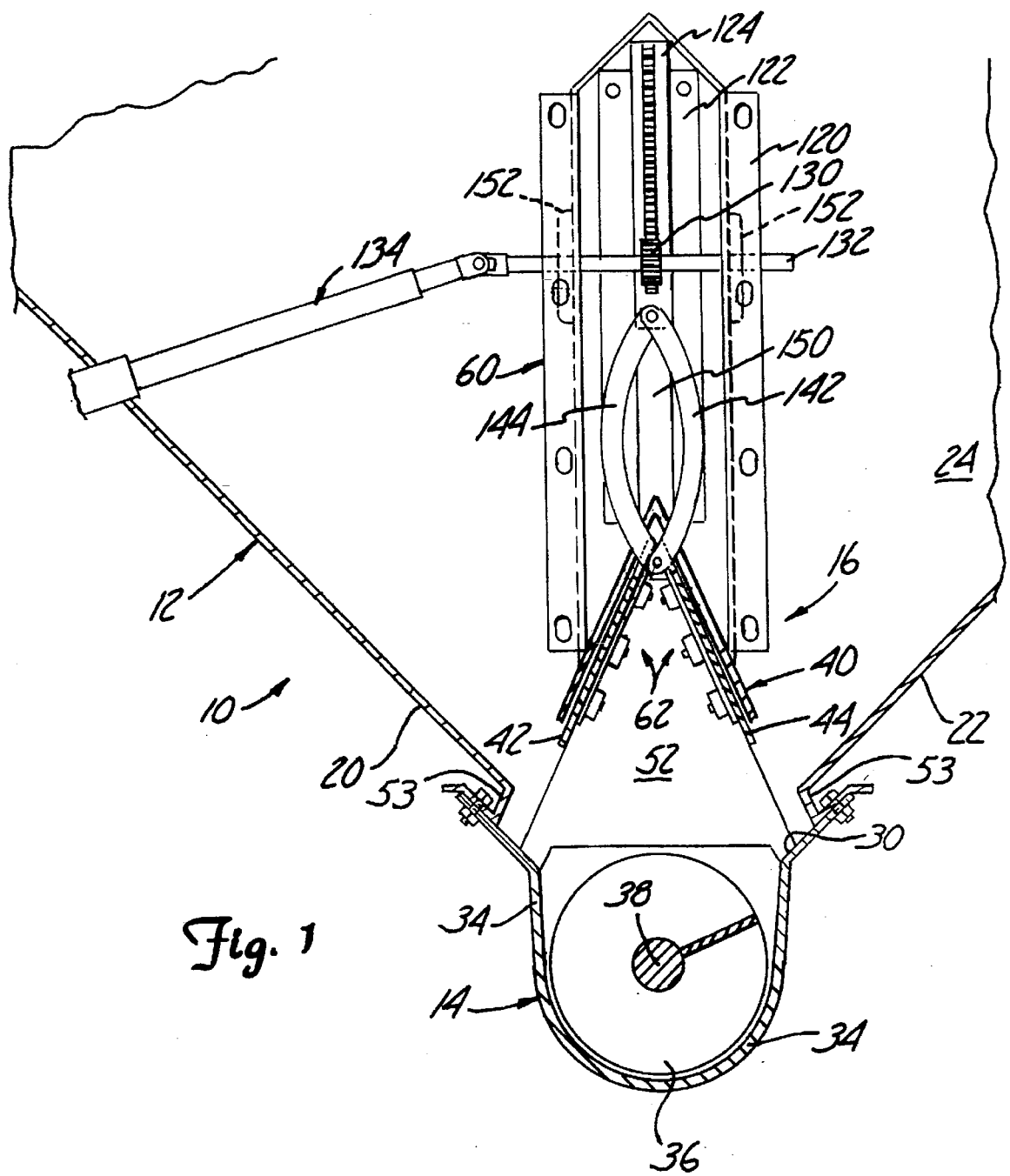
FIG. 1 is a sectional view of the bulk feed delivery system showing the gates in a first position wherein the dispensing opening is open.
Figure 2:
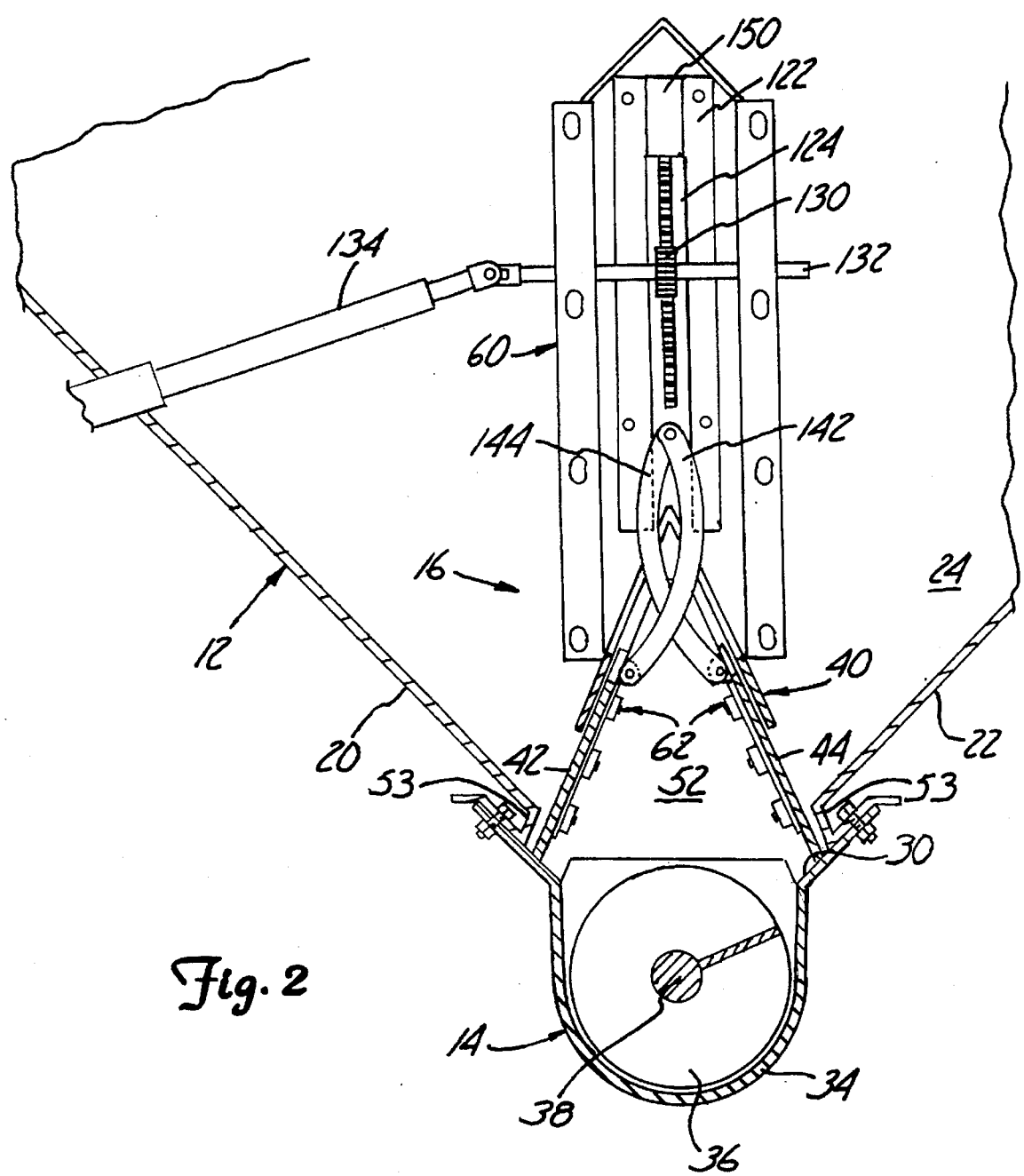
FIG. 2 is a section view of the bulk feed delivery system, similar to FIG. 1, showing the gates in a second position wherein the dispensing opening is closed.
Figure 3:
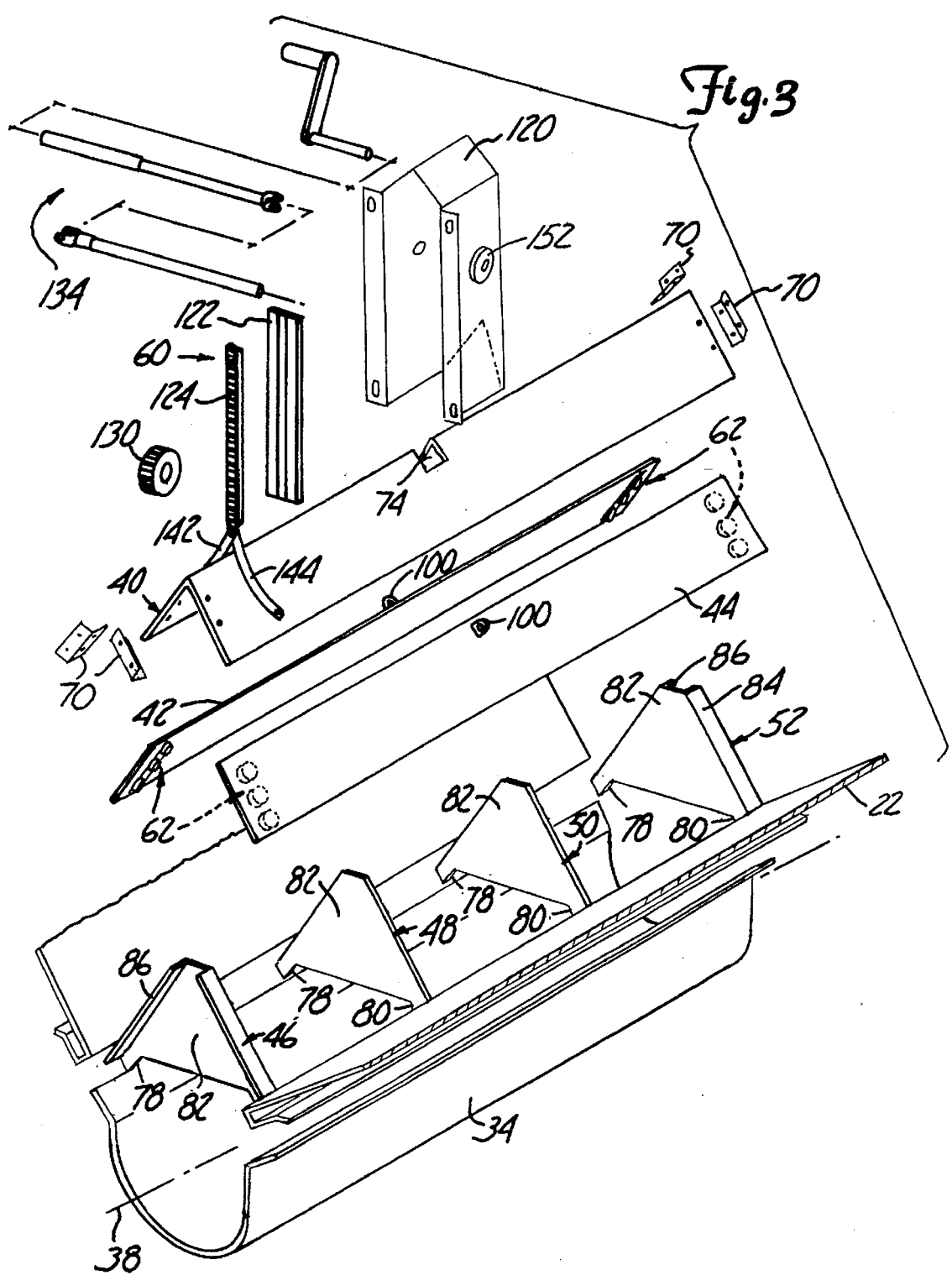
FIG. 3 is an exploded perspective view of the gate mechanism and a portion of the bulk feed body compartment.

As shown in FIG. 1–3, generally, the present invention relates to a bulk feed body delivery system 10 which includes a bulk feed body compartment 12, a transport system 14, and gate mechanism 16.

The bulk feed body compartment 12 is approximately 4 feet in length and has an interior volume to hold a sufficient amount of livestock feed for delivery to a plurality of locations. The bulk feed body compartment 12 includes a first wall 20, second wall 22, a back wall 24 and a front wall (not shown). The walls are arranged to form a dispensing opening 30 at a bottom end of the compartment 12.

The transport system 14 includes auger pan 34 and an auger 36. The auger pan 34 is bolted or otherwise mounted to an underside of the bulk feed body compartment 12 around the dispensing opening 30. The ends of the auger pan are angled parallel to the first and second compartment walls 20 and 22 so that feed is free to flow through the dispensing opening 30. The auger 36 is arranged within the auger pan 34 along a longitudinal axis 38 of the bulk feed body compartment 12 for transporting feed within the auger pan 34. A well known drive mechanism (not shown) is used to power the auger 36.

The gates mechanism 16 includes a gate cover 40, a pair of gates 42 and 44, a plurality of gate supports 46, 48, 50 and 52 (see FIG. 3), a rack and pinion gear controller 60, and a gate guide mechanism 62.

The gate cover 40 has an inverted V-shape wherein a first leg and a second leg thereof are spaced about 120° apart from each other. The gate cover 40 extends along the longitudinal axis 38 and is attached to the bulk feed body compartment 12 by end brackets 70 (shown in FIG. 3). The gate cover 40 has a length of approximately 4 feet which is approximately equal to the length of the gates 42 and 44 and the compartment 12. The gate cover 40 is mounted to the front and back ends of the bulk feed body compartment 12 a distance above the dispensing opening 30 which is sufficient for the gate cover 40 to overlap the gates 42 and 44 when the gates are in an extended position. The gate cover 40 has an opening 74 (see FIG. 3) for the rack and pinion gear controller 60 to engage the gates 42 and 44.

Referring to FIG. 3, the gate supports 46, 48, 50 and 52 frictionally support the gates 42 and 44 under the gate cover 40. Each gate support 46, 48, 50 and 52 is fructo-triangular in shape and includes a first leg 78, a second leg 80, and a solid face 82 forming the fructo-triangular shape. The first and second legs 78 and 80 engage a lip of the auger pan 34 adjacent to the dispensing opening 30 of the bulk feed body compartment 12. End gate supports 46 and 52 include a lip surfaces 84 and 86 which extend in a direction towards the front and rear ends, respectively, of the compartment 12. The lip surfaces 84 and 86 extend perpendicular to the solid face 82 and provide additional support for the gate ends 46 and 52 which interact with the gate guide mechanism 62.

The gates 42 and 44 are arranged to frictionally engage the gate supports 46, 48, 50 and 52 as they are raised and lowered between a first or retracted position (See FIG. 1) wherein the dispensing opening 30 is open and a second or extended position where the dispensing opening 30 is closed (See FIG. 2). The gates 42 and 44 are arranged to slide between the gate cover 40 and gate supports 46, 48, 50 and 52 so that in the retracted position the gates are maintained almost entirely under the gate cover 40. In the extended position, the ends of the gates 42 and 44 are sealed behind a lip 53 of the first and second compartment walls 20 and 22, respectively, so that the gates 42 and 44 are arranged substantially perpendicular to the end of the auger pan 34. The gates 42 and 44 are spaced apart from the gate cover 40 so that the gate cover 40 absorbs the downward gravitational weight of the feed within the bulk feed body compartment 12, thereby permitting the gates 42 and 44 to move more freely between the first and second positions. Each gate 42 and 44 includes a hook 100 at its center position for engaging the rack and pinion controller 60 which controls operation of the gates 42 and 44.

The rack and pinion controller 60 includes a housing 120, a rack guide 122, rack gear 124, a pinion gear 130, a pinion shaft 132, a U-joint shaft and handle arrangement 134 and a pair of linkage rods 142 and 144. The housing 120 is mounted to an upper surface of the gate cover 40 over the gate cover opening 74. The housing 120 encloses the entire rack and pinion controller 60 with the exception of the U-joint shaft and handle arrangement 134 which extends from the housing 120 to an exterior surface of the bulk feed body compartment 12 for user actuation.

The guide rack 122 is fixably mounted to a wall of the housing 120 and includes a track 150 operable with the rack gear 124. The rack gear 124 rides within the track 150 in a direction which is substantially perpendicular to the longitudinal axis 38. The pinion gear 130 engages the rack gear 124 and is rotatably mounted within the housing 120 on the pinion shaft 132 for engagement of the rack gear 124. The pinion shaft 132 is fixably mounted within brackets 152 for rotation about an axis thereof. The pinion shaft 132 is connected to the U-joint shaft and handle arrangement 134. The linkage rod 142 is connected between a lower end of the gear rack 124 and the hook 100 of gate 42. The linkage rod 144 is connected between the lower end of the gear rack 124, at the same place as the linkage rod 142, and the hook 100 of gate 44. The linkage rods 142 and 144 each have an arcuate shape so that the linkage rods 142 and 144 cross over each other when moving the gates 42 and 44 between the extended and retracted positions as shown in FIGS. 1 and 2.

Figure 4:
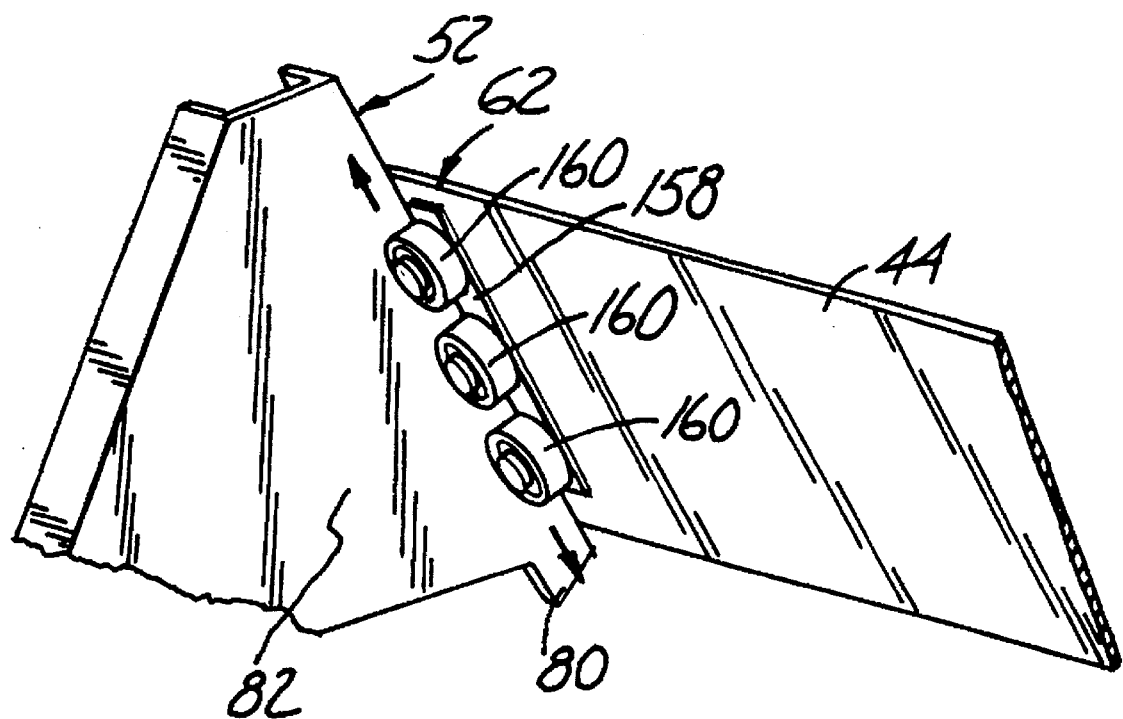
FIG. 4 is a fragmentary perspective view showing the gate guide mechanism controlling movement of a gate with respect to a gate support.
Figure 5:
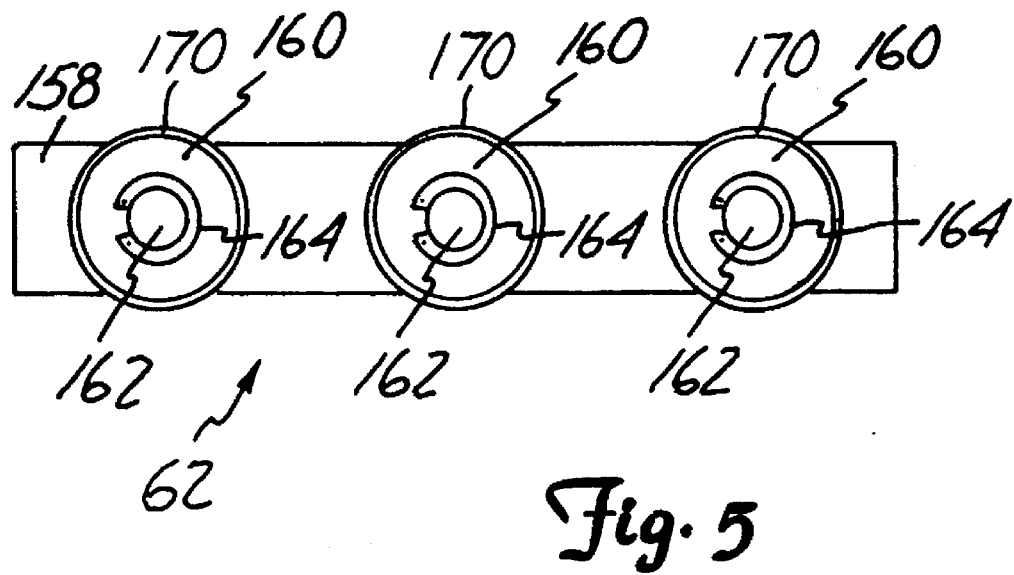
FIG. 5 is a top plan view of a gate guide mechanism.

Referring specifically to FIGS. 4 and 5, a gate guide mechanism 62 is provided at each end of each gate 42 and 44 to control the lateral movement of the gates 42 and 44 as they are raised and lowered between the first and second positions. Each gate guide mechanism 62 includes a base plate 158, a plurality of wheels 160, a roller pin 162 for each wheel, a retainer clip 164 for each roller pin 162. The wheels 160, preferably three of them, are equally spaced on the underside of both ends of the gates 42 and 44 and are operable with the solid face 82 of the respective gate support 46 and 52. A tight tolerance is provided between the wheels 160 and the gate supports 64 and 52 to control the lateral movement of the gate 42 and 44 and ensure an even movement of the gates 42 and 44 between the first and second position to thereby provide a more even flow of grain through the dispensing opening and to prevent jamming of the gate ends against the walls of the compartment body.

The base plate 158 is preferably assembled with the wheels 160 and then welded to the underside of the gates 42 and 44. The width of the base plate 158 is smaller than the diameter of the wheel 160 so as not to interfere with the engagement of the wheels 160 to the gate supports 46 and 52. The roller pins 162 have a diameter of approximately 0.500 inches and are each welded perpendicularly on the base plate 158. Each of the wheels 160 are then rotatably mounted on a respective roller pin 162. The respective retainer clip 164 engages a groove (not shown) in the roller pins to lock each of the respective wheel 160 on the respective roller pin 162. The base plate 158 and the roller pins 162 are preferably made of aluminum. The wheels 160 are preferably polyethylene sump rollers with an inner diameter of 0.515 inches, an outer diameter of 1½ inches, and a thickness of 0.475 inches. The front and back circumferential surfaces of each wheel may be provided with a 45° beveled surface 170 over a width of 0.03 inches.

In operation, the gates 42 and 44 are in the closed position shown in FIG. 2 for filling the bulk feed body compartment 12 with livestock feed for transportation to a desired location. At the desired location, a user activates the U-joint shaft and handle 134 for rotation of the pinion shaft 132. Rotation of the pinion shaft 132 turns the pinion gear 130 about its fixed axis. Rotation of the pinion gear 130 then moves the rack gear 124 upward within the rack guide 122 so that the linkage rods 142 and 144 pull the gates 42 and 44, respectively, upward along the gate supports 46, 48, 50 and 52 to the first position under the gate cover 40, thereby exposing the dispensing opening 30. With particular reference to FIG. 4, as the gates 42 and 44 are raised the plurality of wheels 160 ride against the solid surface 82 of the gate supports 46 and 52 to provide an even and controlled lateral displacement of the gates 42 and 44 during the raising operation. With the dispensing opening 30 exposed, the livestock feed flows into the auger pan 34 and is transported out of the bulk feed body compartment 12 with the auger 36.

When the desired amount of feed has been released through the dispensing opening 30 and transport system 14, the user turns the U-joint shaft and handle 134 in an opposite direction thereby rotating the pinion gear 130 in opposite direction. The pinion gear 130 moves the rack gear 124 downward within the rack guide 122 so that the linkage rods 142 and 144 lower the gates 42 and 44, respectively, along the gate supports 46, 48, 50 and 52. With particular reference to FIG. 4, as the gates 42 and 44 are lowered the plurality of wheels 160 ride against the solid surface 82 of the gate supports 46 and 52 to provide an even and controlled lateral displacement of the gates 42 and 44 during the lowering operation. This arrangement also reduces the likelihood of the gate jamming within the bulk feed body compartment 12.

Although the present invention has been described with reference to preferred embodiments, workers skilled in the art will recognize that changes may be made in form and detail without departing from the spirit and scope of the invention.

What is claimed is:

1. A bulk feed delivery system comprising:

a bulk feed body compartment having a dispensing opening arranged along a longitudinal axis of the compartment;

a transport system mounted to an underside of the bulk feed body compartment around the dispensing opening for transporting feed out of the bulk feed delivery system;

a gate cover extending along the longitudinal axis and attached to an interior of the bulk feed body compartment above the dispensing opening;

a pair of gates including a first gate and a second gate arranged under the gate cover and having a length extending along the longitudinal axis, each gate having a first end and a second end;

a plurality of gate supports arranged perpendicular to and spaced along the length of the gates to support sliding movement of the gates thereon, including a first gate support positioned adjacent the first end of the gates and a second gate support positioned adjacent the second end opposite the first end of the gates, the first gate support having a first surface facing the second end of the gates and the second gate support having a second surface facing the finest end of the gates;

a control mechanism for slidably moving each of the gates over the gate supports between a closed position wherein feed is prevented from flowing through the dispensing opening and an open position wherein feed flows through the dispensing opening; and at least one first guide mechanism mounted to an underside of each of the first and second gates, adjacent the first end of the gates, and at least one second guide mechanism mounted to an underside of each of the first and second gates adjacent the second end of the gates, the first guide mechanisms being operable only with the first surface of the first gate support, and the second guide mechanisms being operable only with the second surface of the second gate support, to prevent movement of the gates along the longitudinal axis of the compartment during movement of the gates between the open and closed positions.

2. The bulk feed delivery system of claim 1, wherein the control mechanism includes a pinion gear, a rack gear, a rack gear movably mounted within the rack guide and operated by the pinion gear, and a flexible linkage mounted between each of the gates and the rack gear such that movement of the rack gear moves the gates between the open and closed positions.

3. The bulk feed delivery system of claim 2, further comprising a housing mounted to an upper surface of the gate cover, the gate cover having an opening through which the flexible linkage extends.

4. The bulk feed delivery system of claim 1, wherein each of the first and second guide mechanisms comprise at least one wheel disposed at each end of each gate and mounted on an axis of rotation perpendicular to the respective gate.

5. The bulk feed delivery system of claim 4, wherein each of the first and second guide mechanisms comprise a base plate upon which the at least one wheel is mounted, wherein the width of the base plate is less than the diameter of the at least one wheel.

6. The bulk feed delivery system of claim 1, wherein each of the plurality of gate supports is triangular in shape such that a first leg thereof is disposed about 120° from a second leg thereof.

7. The bulk feed delivery system of claim 6, wherein the first and second gate supports each have a support lip oriented perpendicular to the first and second legs, respectively.

8. A bulk feed delivery system comprising:

a bulk body having a dispensing opening extending along a bottom end thereof;

a pair of gates arranged adjacent the dispensing opening, the gates having a length with first and second opposite ends and being movable between a first position to close the dispensing opening and a second position to open the dispensing opening;

a plurality of gate supports arranged perpendicular to and spaced along the length of the gates to support sliding movement of the gates thereon, including at least a first gate support having a first surface facing the second end of the gates and a second gate support having a second surface facing the first end of the gates; and a pair of first and second guide mechanisms, each comprising at least one wheel mounted to an underside of a respective gate of the pair of gates, each of the first guide mechanisms being operable with the first gate support, and each of the second guide mechanisms being operable with the second gate support, to prevent movement of the gates in a direction parallel to the length of the gates during movement of the gates between the first and second positions.

9. The bulk feed delivery system of claim 8, further comprising:

an auger pan mounted below the dispensing opening;

an auger arranged within the auger pan for transporting feed within the auger pan; and wherein when the gates are in the first position to close the dispensing opening, each of the gates is arranged relative to the a auger pan to form a substantially perpendicular seal between the respective gate and the auger pan.

10. The bulk feed delivery system of claim 9, further comprising a control mechanism for moving the gates including a pinion gear, rack guide, a rack gear movably mounted within the rack guide and operated by the pinion gear, and a flexible linkage mounted between each of the gates and the rack gear such that movement of the rack gear moves the gates between the first and second positions.

11. The bulk feed delivery system of claim 10, further comprising a housing protecting the control mechanism for the gates, the housing being mounted to an upper surface of a gate cover positioned over the gates, and the gate cover having an opening through which the flexible linkage extends.

12. The bulk feed delivery system of claim 8, wherein each of the plurality of gate supports is triangular in shape such that a first leg thereof is disposed about 120° from a second leg thereof.

13. The bulk feed delivery system of claim 12, wherein each of the plurality of gate supports has an inverted V-shape, and wherein the gates slidingly engage the plurality of gate supports.

14. The bulk feed delivery system of claim 12, wherein the first and second gate supports each have a support lip oriented perpendicular to the first and second legs, respectively, for supporting the first and second gates, respectively.

15. The bulk feed delivery system of claim 8, wherein each of the first and second guide mechanisms comprises a plurality of wheels disposed at each end of each gate and mounted on an axis of rotation perpendicular to the respective gate.

16. The bulk feed delivery system of claim 15, wherein each of the first and second guide mechanisms comprises a base plate upon which the plurality of wheels are mounted, wherein the width of the base plate is less than the diameter of the wheels.

17. The bulk feed delivery system of claim 9, wherein the bulk body further comprises first and second lips extending substantially perpendicular to side walls of the bulk body, the lips being located sufficiently near to an edge of a respective gate to protect the substantially perpendicular seals between the gates and the auger pan when the gates are in the first position for closing the dispensing opening.

18. The bulk feed delivery system of claim 8, wherein the at least one wheel of each of the first guide mechanisms is operable with the first surface of the first gate support, and the at least one wheel of each of the second guide mechanisms is operable with the second surface of the second gate support, to control the lateral movement and orientation of the gates during movement between the first and second positions.

19. A bulk feed delivery system comprising:

a bulk body having first and second inwardly sloping side walls and a dispensing opening extending along a bottom end thereof;

an auger pan mounted below the dispensing opening;

an auger arranged within the auger pan for transporting feed within the auger pan;

a pair of gates arranged adjacent the dispensing opening, the gates being movable between a first position to close the dispensing opening, in which an edge of each of the gates abuts the auger pan to form a substantially perpendicular seal between each of the gates and the auger pan, and a second position to open the dispensing opening; and the bulk body having a first lip extending substantially perpendicular to the first side wall and a second lip extending substantially perpendicular to the second side wall, the first and second lips being configured and arranged to augment the substantially perpendicular seals between the gates and the auger pan when the gates are in the first position to close the dispensing opening.

20. The bulk feed delivery system of claim 19, further comprising:

a plurality of gate supports arranged along a length of the gates to support sliding movement of the gates over the gate supports, including a first gate support having a first surface and a second gate support having a second surface; and a pair of first guide mechanisms mounted on the pair of gates and operable with the first gate support, and a pair of second guide mechanisms mounted on the pair of gates and operable with the second gate support, to prevent movement of the gates in a direction parallel to the length of the gates during movement of the gates between the first and second positions.

21. The bulk feed delivery system of claim 20, wherein each of the pair of first guide mechanisms comprise at least one wheel, mounted to an underside of a respective gate of the pair of gates, operable with the first surface of the first gate support, and each of the pair of second guide mechanisms comprise at least one wheel, mounted to an underside of a respective gate of the pair of gates, operable with the second surface of the second gate support.

* * * * *

UNITED STATES PATENT AND TRADEMARK OFFICE
CERTIFICATE OF CORRECTION

PATENT NO. : 5,658,116

DATED : AUGUST 19, 1997

INVENTOR(S) : GREGORY J. KRULL

It is certified that error appears in the above-indentified patent and that said Letters Patent is hereby corrected as shown below:

Col. 3, line 5, delete "dosed", insert --closed--

Col. 4, line 8, delete "dip", insert --clip--

Col. 5, line 13, delete "finest", insert --first--

Signed and Sealed this

Twenty-eighth Day of April, 1998

Attest:

BRUCE LEHMAN

Attesting Officer

Commissioner of Patents and Trademarks